US008567985B2

(12) United States Patent
Peng

(10) Patent No.: US 8,567,985 B2
(45) Date of Patent: Oct. 29, 2013

(54) ILLUMINATION DEVICE HAVING A DISPLAY MODULE AND A DETECTING MODULE ASSOCIATED THEREIN

(75) Inventor: Alfred Peng, Tainan (TW)

(73) Assignee: Chi Lin Technology Co., Ltd., Tainan (TW)

( * ) Notice: Subject to any disclaimer, the term of this patent is extended or adjusted under 35 U.S.C. 154(b) by 291 days.

(21) Appl. No.: 13/017,009

(22) Filed: Jan. 30, 2011

(65) Prior Publication Data

US 2012/0194080 A1 Aug. 2, 2012

(51) Int. Cl.
*B60Q 1/00* (2006.01)

(52) U.S. Cl.
USPC .......................................... 362/192; 362/157

(58) Field of Classification Search
USPC .......................................... 362/157, 257, 192
See application file for complete search history.

(56) References Cited

U.S. PATENT DOCUMENTS

2005/0000559 A1* 1/2005 Horio et al. .................. 136/205
2010/0106588 A1* 4/2010 Jones et al. ................ 705/14.24
2011/0127916 A1* 6/2011 Kim ............................ 315/130

FOREIGN PATENT DOCUMENTS

TW M356911 U 5/2009
TW I316592 B 11/2009

* cited by examiner

*Primary Examiner* — Thuy Vinh Tran
(74) *Attorney, Agent, or Firm* — Cheng-Ju Chiang

(57) ABSTRACT

An illumination device including a lighting device, a detecting module and a display is disclosed. The detecting module is configured for detecting information of the lighting device. The display is configured for receiving the information and displaying the information thereon. Therefore, the user could know the information of the lighting device timely.

20 Claims, 1 Drawing Sheet

ILLUMINATION DEVICE HAVING A DISPLAY MODULE AND A DETECTING MODULE ASSOCIATED THEREIN

TECHNICAL FIELD

The present disclosure generally relates to an illumination device.

BACKGROUND

Nowadays, an illumination device is a common electrical device which is widely used in the human daily life. However, the common illumination device cannot indicate a power consumption state and a used time thereof. Therefore, the user cannot know the power consumption and the used time of the illumination device, thus the user could not charge the illumination device, replace battery of the illumination device, or replace light source of the illumination device in time.

BRIEF DESCRIPTION OF THE DRAWINGS

The components in the drawing are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF EMBODIMENTS

Reference will now be made to the drawings to describe exemplary embodiments in detail.

Figure 1:
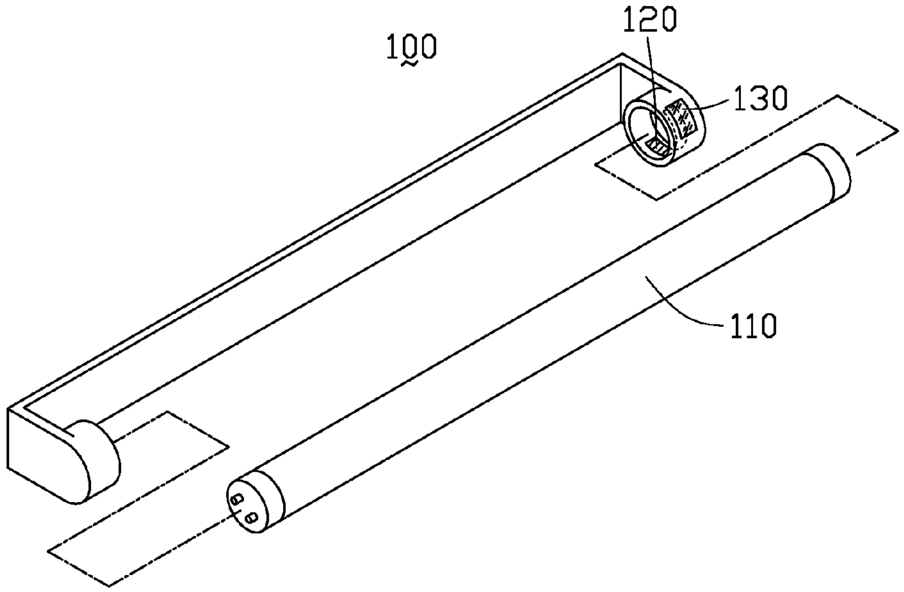
FIG. 1 is a structural schematic view of an illumination device in accordance with an exemplary embodiment of the present disclosure.
Figure 2:
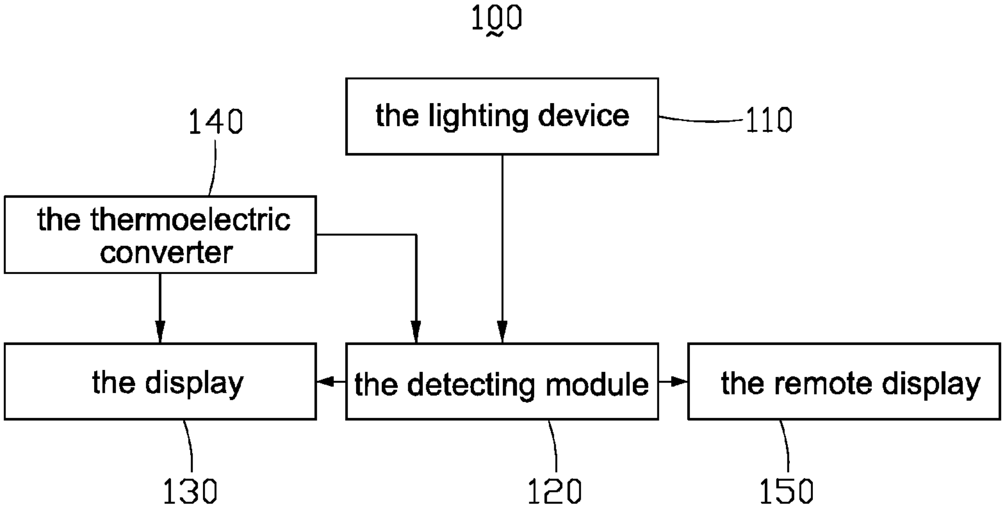
FIG. 2 is a block schematic view of the illumination device as shown in FIG. 1.

FIG. 1 is a structural schematic view of an illumination device in accordance with an exemplary embodiment of the present disclosure, and FIG. 2 is a block schematic view of the illumination device as shown in FIG. 1. As shown in FIGS. 1 and 2, the illumination device 100 comprises a lighting device 110, a detecting module 120 and a display 130. The illumination device 100 further comprises a lampshade (not labeled) which covers the lighting device 110 and directs its light. The detecting module 120 may be adjacent to the lighting device 110, for example, the detecting module 120 may be attached on an inner surface of the lampshade for detecting information of the lighting device 110. The display 130 may be disposed on an outer surface of the lampshade and be electrically coupled to the detecting module 120 for displaying the information of the lighting device 110.

The lighting device 110 may use light-emitting diodes (LEDs) as light sources to emit light. The LEDs have many advantages, such as long lifetime, low power consumption, high luminance, and good environmental protection, etc. Since the lighting device 100 of the present disclosure uses the LEDs as the light sources, the lighting device 100 of the present disclosure may be called as an LED lighting device.

The detecting module 120 may be configured for detecting the information of the lighting device 110, such as a used time, power consumption and lifetime, etc. The detecting module 120 may comprise various kinds of sensors (not shown) for detecting the information of the lighting device 110. For example, the detecting module 120 may comprise an optical sensor configured for detecting a light-attenuation rate of the lighting device 110 to obtain the lifetime of the lighting device 110.

The display 130 is electrically coupled to the detecting module 120 for receiving the information of the lighting device 110 from detecting module 120 and displaying the information thereon. The display 130 may be a low power consumption display, such as a bistable display. The display 130 is electrically coupled to the detecting module 120 by a wire/wireless mode.

In addition, the illumination device 100 may further comprise a thermoelectric converter 140 arranged adjacent to the lighting device 110. Since the thermoelectric converter 140 is arranged adjacent to the lighting device 110, the thermoelectric converter 140 may gather the heat generated from the lighting device 110, and then convert the heat generated from the lighting device 110 into the electric power. Furthermore, the thermoelectric converter 140 supplies the electric power to the display 130 such that the display 130 could normally operate. In addition, the electric power converted by the thermoelectric converter 140 may be further supplied to the detecting module 120 such that the detecting module 120 also could normally operate.

In operation, the detecting module 120 employs various kinds of the sensors to detect the information of the lighting device 110, such as the used time, the power consumption and the lifetime, and then generates various electronic signals corresponding to the information of the lighting device 110. Then the detecting module 120 transmits the electronic signals to the display 130, and the display 130 processes the electronic signals to display an image with respect to the information of the lighting device 110 thereon. In addition, the thermoelectric converter 140 may gather the heat generated from the lighting device 110 and convert heat into the electric power to supply the electric power to the display 130 and/or the detecting module 120 such that the display 130 and/or the detecting module 120 could normally operate.

Furthermore, the illumination device 100 may further comprise a remote display 150 which is also electrically coupled to the detecting module 120 by a wire/wireless mode. Therefore, the user also could see the information displayed on the remote display 150.

In summary, the illumination device 100 of the present disclosure could display the information of the lighting device 110 on the display 130. Thus the user could know the used time, the power consumption or the lifetime of the lighting device 110 timely.

Of course, it should be understood for a person skilled in the art that the present disclosure may also be applied to other electrical devices. In other words, the present disclosure uses the detecting module for detecting the information of the electrical device, and uses the display for displaying the information thereon.

It is to be understood, however, that even though numerous characteristics and advantages of preferred and exemplary embodiments have been set out in the foregoing description, together with details of the structures and functions of the embodiments, the disclosure is illustrative only; and that changes may be made in detail within the principles of present disclosure to the full extent indicated by the broad general meaning of the terms in which the appended claims are expressed.

What is claimed is:

1. An illumination device, comprising:

a lighting device;

a detecting module configured for detecting information of the lighting device;

a display configured for receiving the information and displaying the information thereon; and a lampshade covering the lighting device and directing light of the lighting device;

wherein the display is disposed on a surface of the lampshade facing away from the lighting device for displaying the information of the lighting device.

2. The illumination device of claim 1, wherein the information of the lighting device comprises at least one or more of a used time, a power consumption and a lifetime.

3. The illumination device of claim 1, wherein the display is a low power consumption display.

4. The illumination device of claim 3, wherein the display is a bistable display.

5. The illumination device of claim 1, further comprising:

a thermoelectric converter arranged adjacent to the lighting device, wherein the thermoelectric converter is configured for converting heat energy generated from the lighting device into electric power and supplying the electric power to the display.

6. The illumination device of claim 1, wherein the detecting module comprises an optical sensor configured for detecting a light-attenuation rate of the lighting device.

7. The illumination device of claim 1, further comprising:

a remote display, electrically coupled to the detecting module for displaying the information thereon.

8. The illumination device of claim 7, wherein the remote display is electrically coupled to the detecting module by a wireless mode.

9. The illumination device of claim 7, wherein the remote display is electrically coupled to the detecting module by a wire mode.

10. The illumination device of claim 1, wherein the detecting module is disposed on another surface of the lampshade opposite to the surface having the display thereon for detecting the information of the lighting device.

11. An illumination device, comprising:

an LED (light emitting diode) lighting device comprising at least one LED;

a detecting module configured for detecting information of the lighting device; and a display configured for receiving the information and displaying the information thereon; and a lampshade covering the lighting device and directing light of the lighting device;

wherein the display is disposed on a surface of the lampshade facing away from the lighting device for displaying the information of the lighting device.

12. The illumination device of claim 11, wherein the information of the lighting device comprises at least one or more of a used time, a power consumption and a lifetime.

13. The illumination device of claim 11, wherein the display is a low power consumption display.

14. The illumination device of claim 13, wherein the display is a bistable display.

15. The illumination device of claim 11, further comprising:

a thermoelectric converter arranged adjacent to the lighting device, wherein the thermoelectric converter is configured for converting heat energy generated from the lighting device into electric power and supplying the electric power to the display.

16. The illumination device of claim 11, wherein the detecting module comprises an optical sensor configured for detecting a light-attenuation rate of the lighting device.

17. The illumination device of claim 11, further comprising:

a remote display, electrically coupled to the detecting module for displaying the information thereon.

18. The illumination device of claim 17, wherein the remote display is electrically coupled to the detecting module by a wireless mode.

19. The illumination device of claim 17, wherein the remote display is electrically coupled to the detecting module by a wire mode.

20. The illumination device of claim 11, wherein the detecting module is disposed on another surface of the lampshade opposite to the surface having the display thereon for detecting the information of the lighting device.

* * * * *